United States Patent
Koistinen et al.

(10) Patent No.: US 6,601,113 B1
(45) Date of Patent: Jul. 29, 2003

(54) SYSTEM PLATFORM FOR A COMMUNICATION SYSTEM

(75) Inventors: Jari Tapani Koistinen, Stockholm (SE); Einar Wennmyr, Haninge (SE); Eui Suk Chung, Waltham, MA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/093,073

(22) Filed: Jun. 8, 1998

Related U.S. Application Data (63) Continuation of application No. PCT/SE96/01553, filed on Nov. 27, 1996.

(30) Foreign Application Priority Data

Dec. 8, 1995 (SE) .............................................. 9504392

(51) Int. Cl.$^7$ ................................................ G06F 9/40
(52) U.S. Cl. ................................... 709/316; 379/92.04
(58) Field of Search ................................. 709/310–320, 709/330–332; 379/92.04, 121.06, 130, 140

(56) References Cited

U.S. PATENT DOCUMENTS

| 5,057,996 | A |   | 10/1991 | Cutler et al. ................. | 709/106 |
| 5,136,712 | A |   | 8/1992  | Perazzoli et al. ........... | 709/104 |
| 5,421,015 | A |   | 5/1995  | Khoyi et al. ................ | 709/107 |
| 5,652,834 | A |   | 7/1997  | Jansson ........................ | 714/37 |
| 5,734,708 | A |   | 3/1998  | Bäckström ................... | 379/201 |
| 6,119,125 | A | * | 9/2000  | Gloudeman et al. ........ | 707/103 |
| 6,467,085 | B2| * | 10/2002 | Larsson ...................... | 717/165 |

FOREIGN PATENT DOCUMENTS

WO             95/20855           8/1995

OTHER PUBLICATIONS

Lamping et al., "Issues in the Design and Specification of Class Libraries", ACM, Proceedings of the Conference on Object–Oriented Programming, Systems, Languages, and Applications, pp. 435–451, 1992.*

Bright, R.E. et al., "Service Creation in an Intelligent Network", *IEEE, AT&T Bell Laboratories*, pp. 137–140, (1989).

Krohn, G., "Plattfor für Telefonmehrwertdienste", *NET Nachrichten Elecktronik und Telematik*, vol. 49, No 5, May 1995, pp. 34–36.

Van Hal, Paul et al., "Service Script Interpreter, an Advanced Intelligent Network Platform", *Ericsson Review*, Vol 67, No. 1, (1991) pp. 12–22.

Hino, K. et al., "To–be–IN: Object–Oriented Telecommunications Services Testbed System", *IEICE Transactions on Communiations*, vol. E77–B, No. 11, (Nov. 1994), pp. 1332–1341.

* cited by examiner

*Primary Examiner*—St. John Courtenay, III (57) ABSTRACT

An object oriented system platform for a telecommunication system that provides subscriber services includes an upper layer containing applications in the form of base and supplementary functions providing base and supplementary services. This layer is implemented with base objects and extension objects. The base objects are object types implementing functions which may need extension in the future, each object type being designed for a particular task which can be performed with a minimum of coordination with other base objects. The extension objects are object types implementing extension functions which form extensions to the base functions and make it possible to add new services and modify and extend existing services without changing the software of a system that has already been implemented and supplied.

22 Claims, 7 Drawing Sheets

```
OBJECT TYPE BASE : theBase
        DERIVED FROM DtexBase
IS
        ATTRIBUTES
                evg : anEventGenerator;
                pp : DelosInteger;
        METHODS
                CONSTRUCTOR();
                method1();
                method2();
        BEHAVIOUR
                BODY IS
                        i : DelosInteger;
                        a : REFERENCE TO ObjectType;
                        INITIAL STATE firstState;
                BEGIN
                        WAIT STATE firstState IS
                                WHEN ev1() FROM evg TO middleState;
                        END;
                        STATE middleState IS CASE i + 3 IS
                                WHEN 5 TO almostLastState DO ... ;
                                WHEN 6 TO middleState DO ... ;
                                DEFAULT TO lastState;
                        END;
                        STATE almostLastState IS
                                .....
                        END;
                        STATE lastState IS
                                DEFAULT EXIT;
                        END;
                END;
END;
```

Fig. 4

```
REALIZATION theBaseReal OF theBase IS
        CONSTRUCTOR() IS
                v : VType;
                INITIAL STATE start;
                FINAL STATES done;
        BEGIN
                // ...
        END;
        METHOD method1() IS
                INITIAL STATE s1;
                FINAL STATES s2, s3;
        BEGIN
                // ...
        END;
        METHOD method2() IS
                v : VType;
                INITIAL STATE init;
                FINAL STATES fin;
        BEGIN
                // ...
        END;
        BODY AS SPECIFICATION;
END;
```

Fig. 5

```
EXTENSION VIEW theBaseView OF theBase IS
    BASE theBase;

ATTRIBUTES
        evg : anEventGenerator;

METHODS
        method1();

TOP WAIT STATE firstState IS
        COPS middleState;
        HIDE method1(); // evg is visible, method1 is hidden
    END;

TOP COP STATE middleState IS
        RESULT : DelosInteger;
        SHOW evg; // again, evg is visible, method 1 is hidden
    END;

TOP STATE almostLastState IS
        SHOW ALL;
    END;

COP STATE lastState;
END;
```

Fig. 6

```
OBJECT TYPE EXTENSION : theExtObj
    EXTENSION
        // The view used
        EXTENSION VIEW theBaseView;
        // Properties of each extension method:
        EXTENSION METHOD ext1 IS
            PRIORITY CLASS TMon;
            CALLED FROM firstState, middleState;
        END;
    IS
    METHODS
        theExtObjMethod5();
        theExtObjMethod6();
    BEHAVIOUR
        EXTENSION METHOD ext1 IS
            INITIAL STATE comienzo;
            FINAL STATES fin;
        BEGIN
            // ...
        END;
END;
```

Fig. 7

```
REALIZATION aFastOne OF theExtObj IS
     METHOD theExtObjMethod5() IS
          INITIAL STATE casa;
          FINAL STATES trabajo;
     BEGIN
          // ...
     END;

METHOD theExtObjMethod6() IS
          INITIAL STATE trabajo;
          FINAL STATES casa;
     BEGIN
          // ...
     END;

EXTENSION METHOD AS SPECIFICATION;
END;
```

Fig. 8

```
EXTENSION VIEW theBaseView_ExtObjView
     OF theExtObj IS
     BASE theBase;
     // ...
END;
```

SYSTEM PLATFORM FOR A COMMUNICATION SYSTEM

This application is a continuation application of International Application No. PCT/SE96/01553, filed Nov. 27, 1996, which designates the United States.

TECHNICAL FIELD OF THE INVENTION

The present invention generally relates to an object oriented system platform for a telecommunication system that provides subscriber services. Such a platform can generally be described as including an operating system in a lower layer, an application platform located thereon and containing suitable telecommunication abstractions in the form of resource objects, and thereupon an upper layer containing desired applications in the form of base and supplementary functions providing base and supplementary services.

Subscriber services provided by a communication system can include base services and supplementary services which are provided by base functions and supplementary functions, respectively of the system. The supplementary functions of a system are optional, market dependent and can be supplied to a customer after the system providing the base services has been supplied. The later is often the case for subscriber services such as Call Waiting and Call Forwarding on Busy.

DESCRIPTION OF RELATED ART

Supplementary services are often introduced when a system providing the base service has already been developed and supplied. The traditional way of updating the system is then to edit and recompile the existing implementation for having it to support also the new supplementary function and have it to take care of the coordinations between the new and the existing extension functions.

In U.S. Pat. Nos. 5,057,996 and 5,136,712 there is described an object oriented operating system including hardware layers, layers with operating system functions, and software layers. Access to specific objects is required for use of corresponding resources in the system. The objects have a consistent data structure and a consistent method for defining the operations for each object type. The system admits routines for generating new object types without modifying the core of the operating system.

In U.S. Pat. No. 5,421,015 there is described an object oriented data processing system comprising an extendable set of object types and a corresponding set of object managers.

SUMMARY

A general main object of the invention is to render more efficient, in a communication system, the management of the supplementary functions of a system, i.e. the parts of the system that are optional, market dependent or are supplied to a customer after the system providing the base services has been supplied.

A more determined object is to attain this efficiency by enabling modification and extension of the services provided by a system without needing to change the software of the functions that have already been implemented and supplied.

These and other objects which will appear henceforth, have been attained by the characterizing features stated in the patent claims.

In a system platform of the kind defined by way of introduction, the upper layer is implemented with base objects and extension objects. The base objects are object types that implement, with one or more methods included therein, base functions that may need to be extended in the future, and the extension objects are object types that, with one or more methods included therein, enable implementation of extension functions being extensions to the base functions. Each base object type is designed for a particular task, that can be performed with a minimum of coordination with other base objects. The extension objects are designed to admit addition of new services and modification and extension of existing services without changing the software of the services that have already been implemented and supplied. The extension objects can also include object types implementing extension functions which form extensions to the extension functions, and also object types implementing interaction handling extension functions, which handle interaction between supplementary services.

The extension objects enable introduction of extensions in a system in operation which are dynamically bound to base objects that shall be modified.

The extensions are configurable, i.e. enable adding and removing modifications of the system in runtime in a generic way without the designer himself needing to design code for the activation/deactivation proper of the extension, that is handled by the platform.

The behaviour of included object types is defined by describing the behaviour of each method therein as a finite state machine. This state machine consists of a finite number of states and transitions between these states where the code defining the method is executed. The extensions are added at the states, where they then take over the execution control and returns it after having finished its own execution, to another or the same extension point.

The base and extension object types support an extension concept that allows modification and extension of the system without it being necessary to change the existing implementation of the system. More particularly this is attained by loading only definitions of the extensions in the system, that indirectly modify the behaviour of the system by taking over the execution control in specific predetermined extension points.

A specification for an extension object defines at which extension points in the extension object the extension is assumed to take over the control and at which extension points it can return the control.

When an extension object takes over the control, a predefined extension method starts execution.

A runtime system handles creation of extension objects and invocation of their extension methods at the stated extension points.

An extension object has access to attributes and methods of the base object or the extension object from which the extension takes over the control. The attributes and methods may only comprise such that is declared in an object type specification that can be accessed.

In the object type specification there are defined also access restrictions for each extension point by defining that only a specific subset of the attributes and methods in the specification are available for extensions taking over the control in a certain extension point.

The object type specification for an extendable object works like an interface that delimits the amount of information that is visible and available to extensions of the extendable object. An interface layer that is used together with the extension concept is defined by extension views which each define a subset of information in the specification of an extendable object that shall be able to be accessed by the extensions using the view.

For a base object there is a specification that, on the one hand, works as an interface description showing states, attributes and methods available to the extensions and, on the other hand, defines an interface towards the client object that needs to create instances of the base object. The interface is defined by methods of the base object type, that decide which parameters that can be used when creating the new instance.

The specification provides a high level description of the behaviour of the base object type while leaving out implementation details which are unnecessary for attaining an understanding of the function of the object type.

An abstraction layer that is created by an underlying object logic that is used by the base object, and local methods in the base object comprising use of the object logic, contribute to the high abstraction level.

A reasonable abstraction level in a specification is obtained by showing the wait state of the base object in the specification and possibly some selected non-wait states which are fundamental for understanding the function of the base object. Code for execution between the shown states is introduced in local methods declared, but not necessarily behaviour specified, in the specification. A judgement of that to be shown in the specification includes considering which parts of the object type that may be exposed to extensions in the future.

All states, both wait states and non-wait states and all explicitly denominated extension points, are shown in the method specification. Action code is used at state transitions in local methods. If certain parts of the behaviour do not need to be extendable, these are introduced in their entirety in local methods being defined in the specification or realization, or on an implementation level.

The object type realization is used for parts of base objects which do not need to, or cannot, be extendable, and which are not necessary to be shown in the specification to create a high level description, but where a definition is preferred instead of using implementation language directly. In the realization there are introduced definitions of local methods that introduce action code. In the realization there is provided, while overriding behaviour definitions included in the specification, a more detailed behaviour definition, that implies a refining of the behaviour specification that is provided in the specification.

The extension concept according to the invention has a number of valuable properties. It is a fine-grained way of making modifications, by it being not necessary to override whole methods, which is the mechanism that is available in most object oriented formalisms. Instead the override can be performed in certain extension points within methods. The extension concept forms a frame work for taking care of the complexity caused by introducing many supplementary functions in a ready-developed and supplied system. This is made possible by describing the modifications caused by each extension separately, whereupon the extensions can in turn be coordinated when there is a need. Such coordinations between supplementary functions can also be expressed as separate extensions, in this case as extensions to the supplementary functions. This makes it possible to manage the optional parts of the system and their dependencies in a modular way.

BRIEF DESCRIPTION OF THE DRAWINGS

The invention will now be described more closely below with reference to the attached drawings, on which FIG. 1 schematically illustrates a system platform for a telecommunication system that can provide subscriber services, FIGS. 11–14 are views showing examples illustrating the use of the extension mechanism, wherein

DETAILED DESCRIPTION OF EMBODIMENTS

Figure 1:
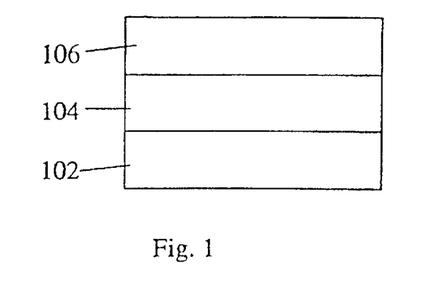

With reference to FIG. 1, a system platform for a telecommunication system contains a number of functions, or layers. These layers can be generally described as containing an operating system in a lower layer 102, an application platform 104 located thereon and containing suitable telecommunication abstractions in the form of resource objects, and thereon a layer 106 containing desired applications in the form of base and supplementary functions which provide base and supplementary services.

Henceforth the concept "category" will be used to define different types of objects included in the layer 106. More particularly, a "category" characterizes an object syntactically, but also characterizes its location and function in the system architecture. Object types, described more closely below, of two categories denominated BASE and EXTENSION, respectively, are included in an implementation of the layer 106. The instance of these objects will be denominated base object and extension object, respectively, below.

Furthermore there is below a concept "events" that is used for denominating sending out asynchronous messages. Objects can request supervision of an "event" and thereupon wait for it. Events are declared in an "EVENTS" section in the description of an object type. In the layer 106 the behaviour is driven by events, i.e. the objects react on receipt of asynchronous messages. Events are often generated as the result of a message arriving on an interprocess communication link to a process, in which the object executes. By a process is here meant a program being executed. Below also the denomination execution thread will be used for an execution path in a process. Each execution thread has its own stack and program counter, but all threads in the same process share the same process data (heap).

Each base object type is designed to perform a specific task such as managing the setting up of a call in a telephony system. When such a task shall be performed there is created an instance of the base object type. This object will then have the control over how the task is performed. Details on lower levels, such as how resources are manipulated for performing the task, are handled by the base object sending out method calls to objects of other categories, e.g. of the category "EVENTGENERATOR". Object types of this category represent resources or basic services that are called and that inform their user by generating events.

Base object types are intended to be designed so as to allow their respective tasks to be performed with a minimum of coordination with other tasks going on in the system, i.e. with a minimum of coordination between base objects. This is reflected in the properties of the base and extension categories: each base object is executed in a semi-parallel execution thread, neither a base object nor an extension object can have any methods to be called from the outside and they cannot generate any events. These properties will be described more closely below.

Another important aspect of the base and extension categories is that they support an extension concept allowing the behaviour of a system to be modified and extended without it being necessary to change the existing implementation of the system. Instead modification and extension of the behaviour is attained by loading only the extensions in the system. By means of the extension concept these will then indirectly modify the behaviour of the system by taking over the execution control in specific determined extension points.

The base category shall be used for object types implementing base functionality which may need to be extended in the future, so called base functions. The extension category is used for object types implementing extensions of these base functions, so called extension functions.

The behaviour of an object type is defined by describing the behaviour of each method with a finite state machine by using a specific design language for object modelling, henceforth-referred to as the "design language". Such a finite state machine consists of a finite number of states and transitions between these states, where code is executed as transition actions. The most natural points for adding extensions, the extension points, are therefore the states. An extension can be designed to take over the execution control in an extension point and return the control to another one or the same extension point in the same method. From this point of view extensions can be regarded as additions of new states and state transitions to a state machine. These states and state transitions then modify the existing state transitions of this state machine.

All states in a method can always be used as extension points, but it is also possible to explicitly specify an extension point without introducing a new state, a so called explicitly denominated extension point.

Extension points are classified with respect to whether they allow extensions from the point, termination of extensions at a point or if they can be used for both purposes. For these points the following denominations will be used henceforth.

Take Over Points, TOP, which are extension points wherein the execution control can be transmitted to an extension method of an extension object.

Continuation Points, COP, which are extension points wherein the execution control can be retransferred from an extension method.

Take Over and Continuation Points, TOP COP, which are extension points which can be used both as take-over point and continuation point.

From the beginning (default) all states in an object are take-over and continuation points. This can however be changed in the object type specification if there is a need of making restrictions which have to stand all extensions. The same kind of extensions can also be made in extension views, a concept that will be described more closely below.

The extension concept also admits definition of extensions to extensions. In fact, extensions can be defined on an arbitrary number of levels by means of creating chains, or layers of extensions. Therefore it is necessary to define a vocabulary so as to enable to differ between e.g. the "uppermost" extension in an extension chain and the whole chain of extensions.

The concept "base object" is used for indicating an object comprising the original, unextended base function. If there is a risk for misunderstanding the denomination "original base object" is used.

Extensions are referred togas "extension objects".

The concept immediate base relates to a base object or an extension object from which an extension starts, i.e. an extension takes over from its immediate base.

The more generic denomination base will be used for meaning the whole chain of extensions, comprising the original base object, to which a certain extension object forms an extension. If there is a risk for misunderstanding the denomination "entire base" is used.

Figure 2:
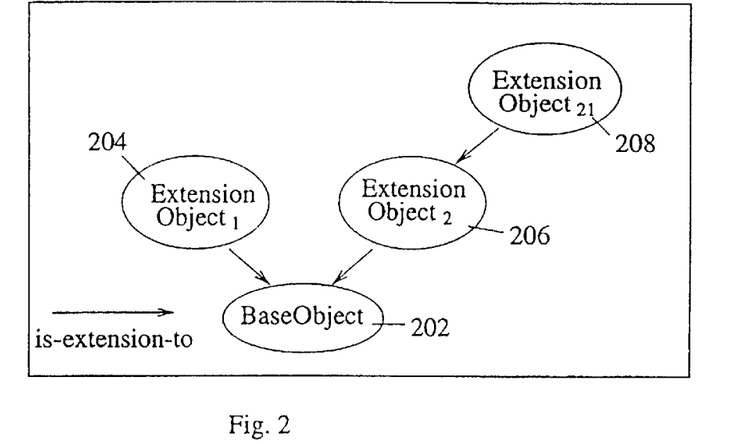
FIG. 2 is a picture intended to illustrate the connection between concepts used in the extension concept according to the invention.

The above mentioned is illustrated in FIG. 2 where an object 202, "BaseObject", is the original base object. To the base object 202 extension objects 204 and 206, "Extension Object$_1$" and "Extension Object$_2$", can be linked. The extension object 206 is the immediate base of a further extension object 208, "ExtensionObject$_{21}$". The base object 202 and the extension object 206 form the base of the extension object 208.

A specification for an extension object defines the extension points in the extension object where the extension is assumed to take over the control and at which extension objects it can return the control. When an extension object obtains the control, it is a predefined extension method, EXTENSION METHOD, that starts execution. The runtime system takes charge of creating extension objects and invoking their extension methods at the given extension points.

As has appeared from the above, also extension objects can in turn have extensions. Extension methods are thus always called implicitly from a base method or from another extension method.

An extension object has access to attributes and methods of the extended object, i.e. the base object or the extension object, from which the extension takes the control. There are, however, some ways of restricting this access. Firstly, it is only the attributes and methods that are declared in an object type specification, that can be accessed. Attributes and methods declared only in a realization are not available for extensions. In the specification it is furthermore possible to define access restrictions for each extension point by defining that only a certain subset of the attributes and the methods in the specification are available for the extensions taking the control in a certain extension point.

The object type specification for an extendable object thus works as an interface that limits the amount of information that is visible and available for extensions of this base object. There is, however, an extra interface layer that it used together with the extension concept, and this is the interface that is defined by the extension views. An extension view defines a subset of information in the specification of an extendable object that shall be able to be accessed by the extensions using the view.

Figure 3:
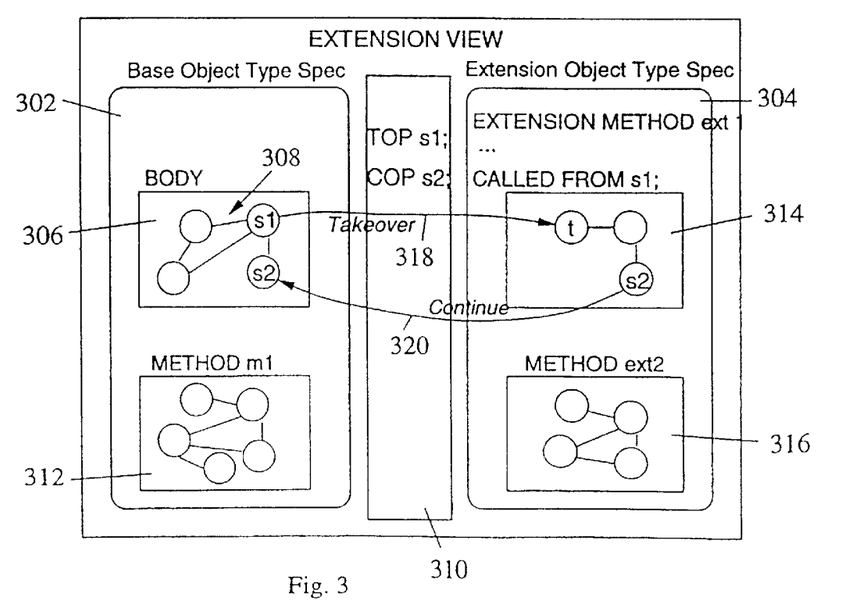
FIG. 3 illustrates the extension concept in an overview.

FIG. 3 illustrates the extension principle. In FIG. 3 a block 302 represents the specification of a base object and a block 304 the specification of an extension object. The specification 302 contains a body method, "BODY", represented by a block 306 in which a finite state machine 308 with four states is indicated. These states include two extension points s1 and s2. In an extension view indicated by a block 310, the extension points s1 and s2 are declared as take-over point and continuation point, respectively, indicated by "TOP s1;" and "COP s2;". A block 312 represents a further method "Method m1" in the specification of the base object by means of an indicated infinite state machine with five states.

The specification 304 of the extension object contains an extension method "EXTENSION METHOD ext1", which in a block 314 is illustrated as containing a finite state machine with three states comprising a start state t and an end state s2. In a block 316 a further extension method, "METHOD ext2", is indicated as containing four states.

The extensions points s1 and s2 are visible from the extension object through the extension view 310. When the method 308 of the base object reaches the state si the execution control is connected over to the extension method ext1, indicated by arrow 318. The extension method ext1 starts executing from its state of origin t. When the execution finally reaches the state s2 in the extension, the control connects back according to arrow 320 to the base, that continues its execution from the state s2. This is performed by the runtime system, i.e. the designer of the extension need not manage this explicitly in his code, other than at a declaration in the extension.

As mentioned earlier, the category BASE is the object type category that is used for modelling base functions, functions which can be extended later on. The base object has certain specific properties. One important property is that the execution of a base object is always performed in a semi-parallel control thread. This is natural, since the object of a base object is to perform a task that can take place independently of other tasks which can proceed in parallel in the system. During execution the object can enter a wait state which is a state in which the execution is stopped until further and the control is transferred to another thread. The execution is resumed when an event that is awaited in the wait state is received.

From the point of view of a user, this property can be attained by creating a new base object instance in the current execution thread and schedule the body method "BODY" of this base object instance for later execution in a new thread. A thread switching is performed when the first current thread enters a wait state. In this step the newly created thread gets a chance to start execution. There can, however, be other threads in the process which are also ready to start execution, so there is no guarantee that the new thread will start execution in precisely this moment. The only guarantee is that it will start execution sooner or later.

In connection with the creation of the new thread a reference to the newly created object instance is returned. This reference can later be used to be synchronized with the termination of the created thread, by awaiting the event that always appears when a thread terminates. The reference can also be used as an argument or be stored in an attribute, but it shall not be used for any other purpose.

Another important property of base objects is that their attributes and methods are hidden for all other objects except their extension objects.

For a base object there can be both a specification and a realization description, both containing behaviour descriptions using the design language. The object of the specification is mainly to act as an interface description of the base object. There are different kinds of clients to a base object for which this specification is relevant.

Firstly, there are extension objects that extend the behaviour of the base object. For these the specification acts as an interface description showing states, attributes and methods, which are available to the extensions. Further access restrictions can also be introduced for extensions by the extension view they use, but they can never access more than that shown in the specification of the base object.

Secondly, the specification defines the interface towards the client objects needing to create instances of the base object. This interface is defined by methods of the base object type. They decide which parameters that can be used at creation of the new instance when a new execution thread shall be created according to that described above.

Another object of the specification is to provide a high level description of the behaviour of the base object type while omitting implementation details which are unnecessary for attaining understanding of the function of the object type. The high abstraction level is partly provided by an abstraction layer created by an underlying object logic that is used by the base object, but also through local methods in the base object that comprise the use of the object logic. A fair abstraction level in a specification can be to show the wait state of the base object in the specification and perhaps certain selected non-wait states which are fundamental for understanding the function of the base object. The code to execute between the shown states can then be introduced in local methods that are declared, but are not necessarily behaviour specified, in the specification.

When it shall be decided what shall be shown in the specification and not, regard has to be taken to which parts of the object type that can be exposed to extensions in the future. The most extendable specification tactics is to show all states, both wait states and non-wait states, and all explicitly denominated extension points, in the specification of the BODY method and to only encapsulate an action code that is used for state transitions, in local methods. If, on the other hand, it is decided that certain parts of the behaviour need not be extendable, these parts can in their entirety be introduced in local methods. These local methods can thereupon be defined either in the specification or the realization or even on the implementation level. If they shall be called from the specification they must however be declared in the specification.

The purpose of object type realizations is that they shall be used for the parts of the base objects which need not or cannot be extendable, and which are not necessary to show in the specification for creating a high level description, but where a definition with a design language is preferred instead of using directly an implementation language. Definitions of local methods encapsulating action code can be located here. In a realization it is also possible to leave out behaviour definitions included in the specification, and provide a more detailed definition. Such a newly defined behaviour definition should be a refining of the behaviour specification given in the specification.

It should be emphasized that no methods, attributes or states that are defined or declared in a realization will be available to extensions of this object type. It is only the information in the object type specification that is visible to the extensions.

It is also possible to specify the whole base object using only a specification in the design language, and no realization in this language. In this case the implementation language can be used for defining certain of the action methods called in the specification, where this is appropriate. Monitoring, "MONITOR", and stopping monitoring, "STOP MONITOR", of events must, however, be performed in the design language either in the specification or in the realization. If "creation/removal" of objects is performed in the design language, likewise the corresponding message "remove/new" for the same object must be performed in the design language, either in the specification or in the realization. If, on the contrary, creation/removal is performed in the implementation language, also the corresponding remove/new must be performed in the implementation language.

For the body method BODY of the object it is obligatory to provide a behaviour definition in the design language in the specification, even if this definition can be allowed to be quite simple, and can be overridden in the realization. For other methods in the base object is, as mentioned, the use of the design language optional.

Figure 4:
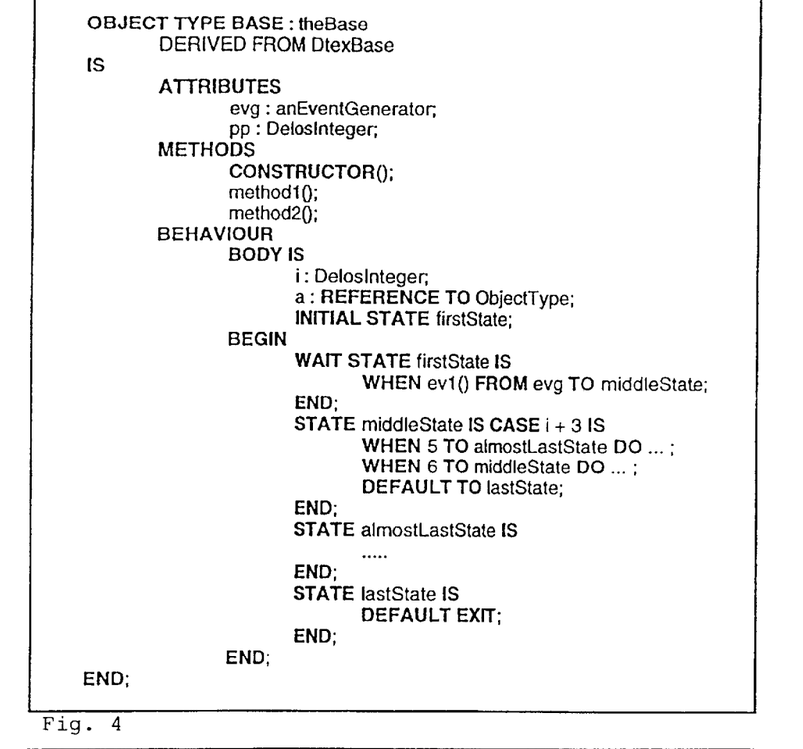
FIGS. 4–6 show examples of a specification, a realization and an extension view, respectively, of a base object.
Figure 5:
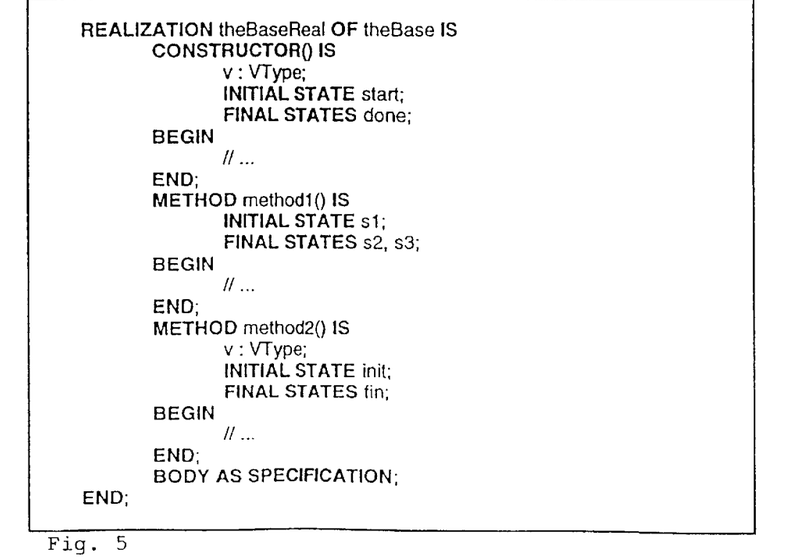

In FIGS. 4 and 5 there are given examples of specification and realization, respectively, of an object "theBase" of base object type.

In the specification shown in FIG. 4 the behaviour of the body method "BODYmethod" has been defined from line 12. The methods "method1" and "method2" and "CONSTRUCTOR" have however only been declared, from line 7. CONSTRUCTOR is a method that is executed when an instance of an object type is created.

In the realization shown in FIG. 5 there is defined from line 2 the behaviour of the methods "CONSTRUCTOR", "method1" and "method2". The body method is stated to be as the one in the specification, line 22.

As mentioned earlier the specification of the base object type serves as an interface description for its clients. Extension views are also a kind of interface description. They are used to further restrict the access to an extendable object for their extensions.

The purpose of having an extra interface layer is to attain some further supervision over which extensions that can be made to a certain object. Different extension views can be created for different purposes. If e.g. a certain view is designed for use of debiting functions and statistics functions it can be enough to show only a small subset of the states and attributes of the extended object. Another use is to define different views for different parts of a function so that the use of an extension of a certain view implies that only a certain function of the extended object is modified. This and similar information can be of value when it is investigated which coordinations between extension functions that can be necessary to implement when a new extension function is introduced in the system.

A base object can thus have several different extension views. Each extension object is, however, designed for a specific extension view. Extension views are used only during the design phase, for different analyse purposes, and do not exist as separate units in the runtime environment.

Figure 6:
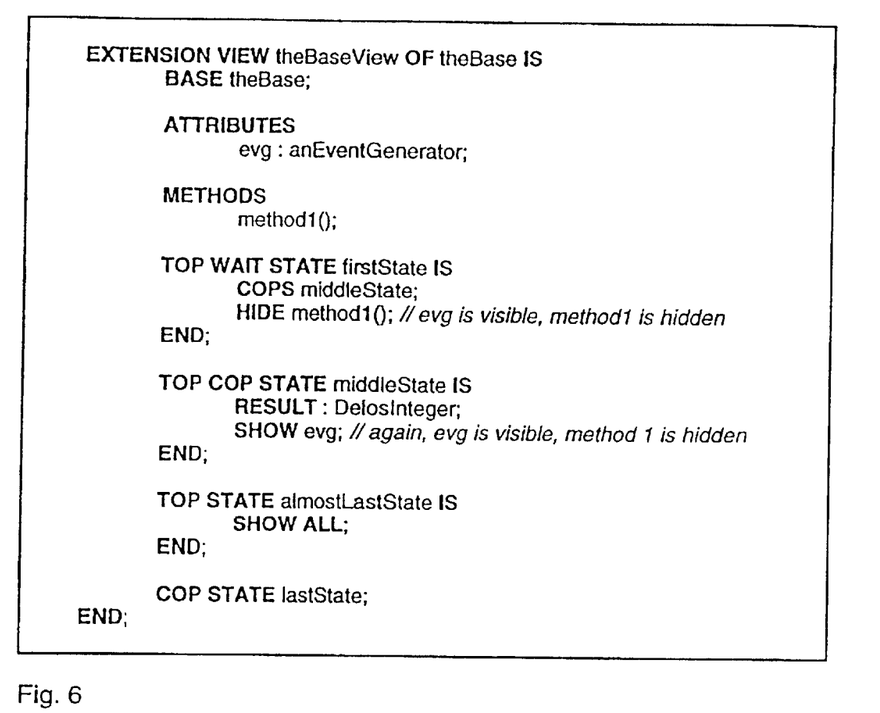

In FIG. 6 there is shown an example of an extension view of the object theBase of base object type in FIG. 4. An extension view is used for creating restricted views of specifications of extendable objects. The extension views cannot define any information which is not already available in the base object. They can only add further restrictions and hide information, that is already visible in the base object. Limitations already specified in the base object cannot be overridden.

In the extension view there is first given a list of methods and attributes in the base object that shall be possible to obtain through extensions, cf. lines 3–6 in FIG. 6. This list defines a subset of attributes and methods existing in the base object. Thereupon the extension points which shall be available to the extensions are listed. For each extension point in the view the following information is specified:

The name of the extension point, cf. lines 7, 11, 15 and 18, respectively, in FIG. 6: TOP WAIT STATE, TOP COP STATE, TOP STATE and COP STATE, respectively. For extension points being states, the key words STATE and WAIT STATE, respectively, are given in the name. For explicitly denominated extension points no such information is given. Furthermore the denomination contains the type of extension point, i.e. take-over point TOP, continuation point COP or take-over and continuation point TOP COP is stated. As mentioned earlier, all extension points in the base object are of the type take-over and continuation point. Here an extension point can be restricted to allow use only as take-over point or only as continuation point. If the basic setting shall be used the keyword TOP COP must however be given.

For each take-over point there is a list of attributes and methods in the base object which will be available to the extension methods starting, from the specified take-over point, cf. lines 9, 12–13 and 16 in FIG. 6. This list is a subset of attributes and methods listed at the beginning of the extension view.

For each take-over point a list of allowed continuation points COPs is given, cf. line 8 in FIG. 6. This information is used for deciding at which extension points an extension taking over the control in the current take-over point is allowed to continue.

For each take-over point there is indicated the type of expression used for branching in the states of the base object. This is only relevant for non-wait states.

It is not possible to refer to local variables of methods in the base object in an extension view.

Since the extension concept also admits extensions to extensions, extension views may be created both for base objects and for extension objects.

For extension objects the same restrictions are valid as for base objects. Their members cannot be accessed by any other objects than their extensions.

Also for extension objects both a specification and a realization can be given. For the extension method of an extension object it is obligatory to give a behaviour definition with the design language in the specification, although this definition is allowed to be quite simple, and it cannot be overridden in the realization. For other methods in the extension objects the use of the design language is optional.

Figure 7:
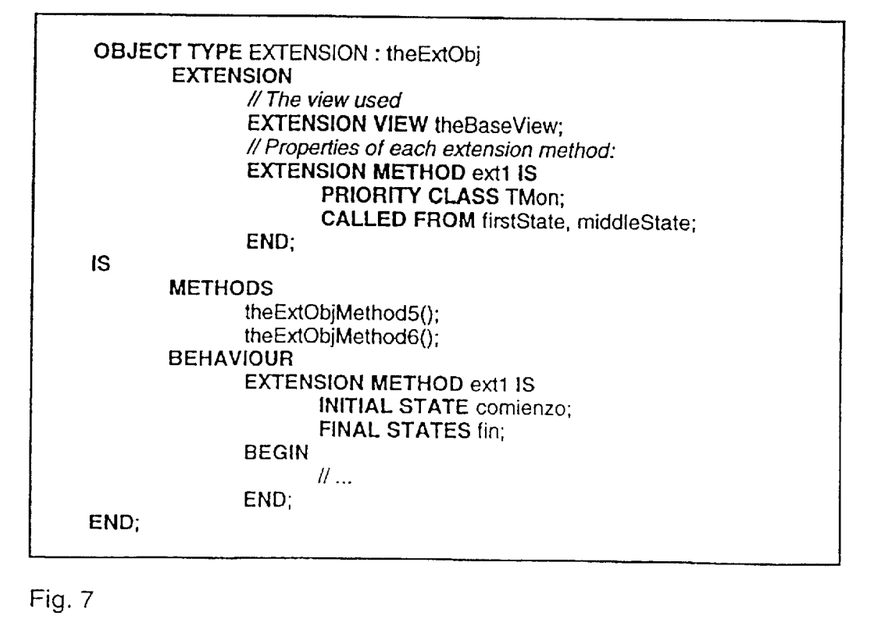
FIGS. 7–9 show examples of a specification, a realization and an extension view, respectively, of an extension object.
Figure 8:
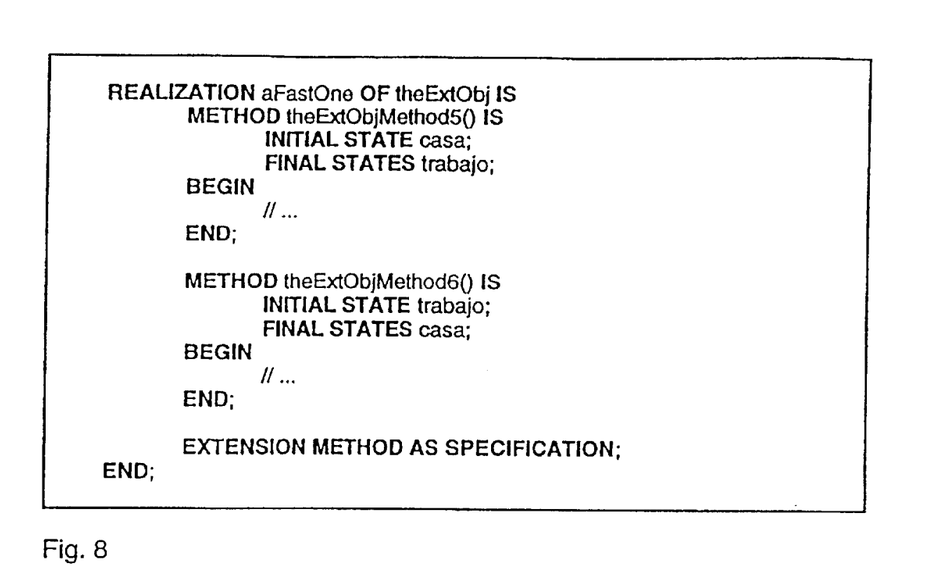
Figure 9:
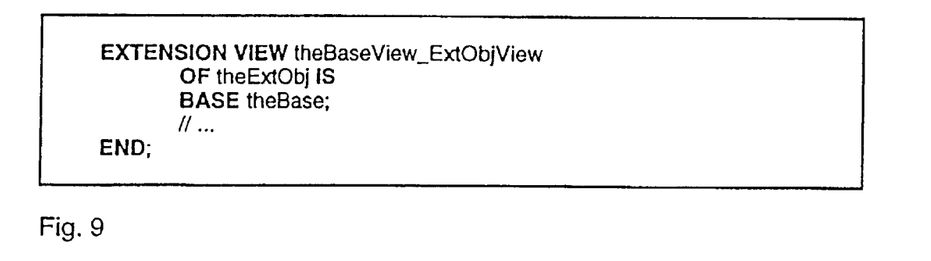

In FIGS. 7, 8 and 9 examples are given of a specification of an object of extension type, "theExtObj", a realization of the same object and an extension view of the object in question, respectively.

Extensions are encapsulated in objects of the category EXTENSION. The specification of an extension object, cf. FIG. 7, defines the view used by the extension object, cf. line 3, at which take-over points its extension methods take over the control, cf. line 8, and the priority class for the extension method, cf. line 7. Several different extension objects can use the same view of a base object. Multiple extensions can even start from the same extension point in the same object.

The methods in an extension object are always executed in the same thread as the base object. All monitoring of events performed in the base object is furthermore also valid in the extension method. In other words, the extension method can receive events which have been monitored in the base object, provided that the identity of the event generator has been made available to the extension method via a view.

The states in the specifications for EXTENSION METHODS can be used as take-over and continuation points, in the same way as states in the specification of the BODY methods of the base objects. The realizations of the extension methods, cf. FIG. 8, can in the same way add several states, cf. lines 2 and 8, but once again they are not available to other extensions.

Further extensions to the extension object theExtObj can be made according to that indicated in the extension view presented in FIG. 9 only in the form of a frame.

Figure 10:
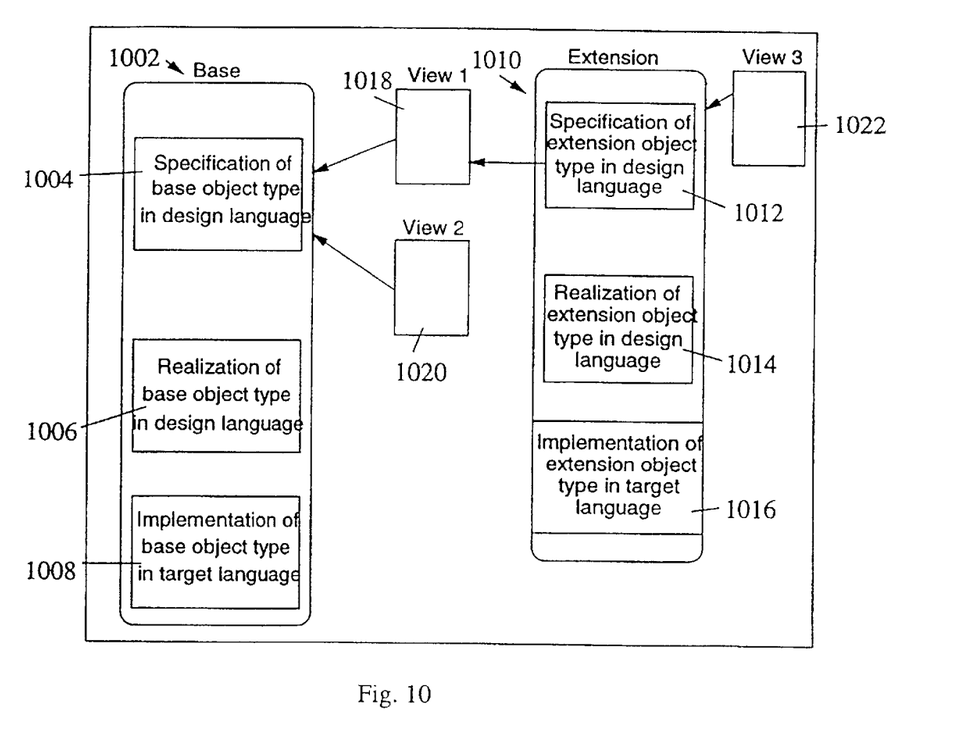
FIG. 10 is a view intended to provide a summarizing overview of the relations between the concepts base object, extension object, and extension view, as well as object type specification, object type realization and an object type implementaion.

FIG. 10 provides a summarizing overview of the relations between the concepts base object, extension object and extension view, as well as object type specification, realization and implementation. In FIG. 10 a stack block 1002 indicates a specification 1004 and realization 1006 in a design language, and implementation 1008 in a target language. In the same way a block 1010 indicates specification 1012 and realization 1014 in a design language, and implementation 1016 in a target language.

The specification 1004 of the base object is a specification on a suitably high abstraction level that can be used to obtain a total understanding of the function of the object type. The specification contains both attribute and method signature declarations as well as behaviour specifications of (a subset of) methods. All states shown in the behaviour specification of the BODY method can be used by extensions.

The realization 1006 of the base object has a more detailed description of the behaviour of the object type. It can override the behaviour definitions of methods in the object type specification. The realization can also define the behaviour of declared methods but not behaviour specified in the specification. New attributes and methods local to the realization can be added. The information added in the realization is not available to extensions. A specification can have more than one realization.

The implementation 1008 of the base object type in target language is a complete implementation of the object type. It consists of generated and, optionally, manually written source code for the target language (C++). The generated parts guarantee that the implementation is prepared for extensions according to the object type specification. The implementation code is generated by using the object type specification and, optionally, one or more of the realizations of the object type in the design language.

At 1018 and 1020 extension views of the base object type specification 1004 are indicated. There can be several views of the same object type specification, but each view is always designed for exactly one object type specification. New views can be created without affecting the base object specification, realization or implementation. The base object type specification 1004 and its views 1018 and 1020 are used when designing extension object types.

The specification 1012 of the extension object type specifies the extension object on the same high abstraction level as the specification of the base object type, Also the realization 1014 and implementation 1016 of the extension object type appears in the same way as for the base object type.

Each specification for the extension object type is always designed by using exactly one extension view 1022. By analogy with the case for base object types one or more extension views can be defined for one extension object type.

As regards code generation the following can be mentioned. Code in the target language (C++) can be generated for object type specifications and realizations. All methods, including CONSTRUCTOR, BODY and extension methods in the specification must be repeated in the realization. Each realization of base object type and each realization of extension object type must follow the following rules:

Each method signature (the methodname dom_FormalArguments [RETURNS dom_Type] part) that is indicated in the specification must always exist also in the realization. This requirement can be fulfilled in one of the ways described below.

With signature is here meant a concept that identifies the element in question, here a method, by stating its name, type of argument and type of return value.

If only the signature of a method is stated in the specification, the BODY method can (the dom_BehaviourBody, i.e. the IS BEGIN . . . END part) either be omitted or stated in the realization.

If the BODY method is omitted in the realization, only a framework of the method is realized in the target language.

If the BODY method is stated in the realization, a complete code is generated in the target language.

If there is a BODY method already in the specification, one key words AS SPECIFICATION can be used in the realization for indicating that the BODY method in the realization is exactly the same as in the specification. Complete target language code will be generated also in this case. The code will not be available to manual changes or additions.

If both the specification and the realization define a BODY method for the same method, complete code is generated from the BODY method stated in the realization. This implies that the behaviour defined in the realization always overrides the behaviour stated in the specification.

Attributes stated in the specification shall not be repeated in the realization. Due to the fact that a method definition stated in the realization completely overrides the corresponding definition in the specification also local variables stated in the specification must be repeated in the realization.

In the following there are described with reference to FIGS. 11–14 some examples, that illustrate use of the extension mechanism.

Figure 11:
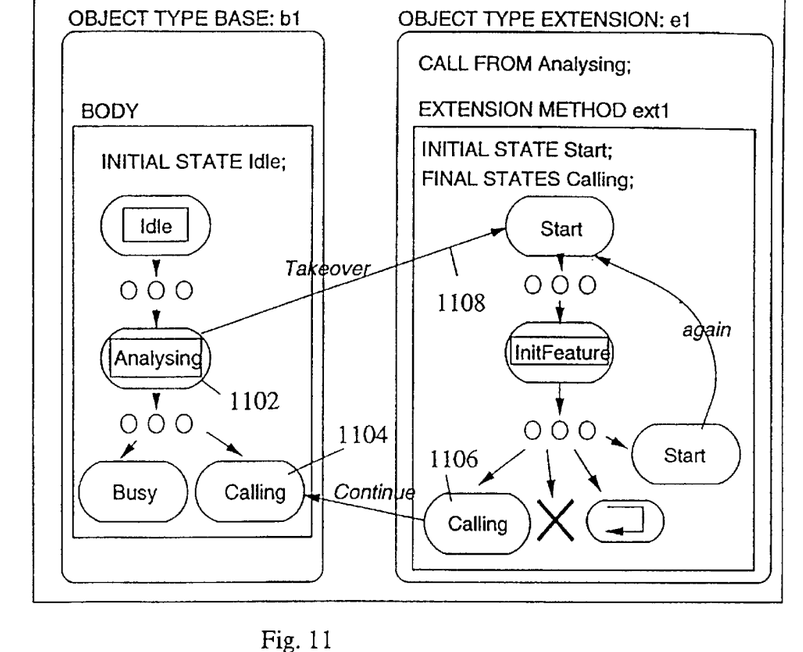
FIG. 11 shows an unconditioned extension case.

In FIG. 11 an example of an unconditioned extension is shown. The example starts from the presumption that the specifications of a base object and an extension object, respectively, are stated as shown in the Figure. In an extension view not shown there is furthermore stated a state analyzing, indicated at 1102, as TOP, and state calling, indicated at 1104 and 1106, as COP.

Generally all extension objects are checked when execution reaches a state declared as TOP. If there is an extension method starting from a current TOP state, the extension method is called. The runtime system will see to it that a corresponding extension object has been created sometime before the first invocation of the extension method of the extension object. If it is not the first time during the execution of the base the extension method is called, the older instance of the extension object can be used again. This object will thus return to its state between invocations of its extension method during the execution of the same base. Instances of extension object types are created for each base object, i.e. an extension object is never shared by two bases.

In the example given in FIG. 11 transition is always performed, indicated by an arrow 1108, to the extension method unconditionally each time the execution of the base reaches the state 1102 analyzing.

There are different ways of ending execution of an extension method. Firstly, EXIT can be used to terminate execution of the whole execution thread. Secondly, there is a specific possibility, denominated BACK (TO BASE) that is used to indicate return of control from an extension to the base where it took the control. Thirdly, an ordinary end state can be used, but used in an extension method it has a specific semantic. In this case a COP state must prevail in the base that has the same name as the end state of the extension method. When execution reaches this end state, execution in the extension method will be interrupted and execution will continue in the COP state in the base.

The difference between EXIT to the state in the base from which the extension started, and BACK resides in what will happen if more than one extension takes over control in the same TOP. When BACK is used the next extension in turn will be executed. Extensions in the highest priority class are always executed first and if there are more than one extension in the same priority class, they are normally executed in an arbitrary order. However, if there is an interference extension entity that has set a certain execution order between the extensions, they are executed in this order.

If EXIT is performed to the TOP state in the base from where the execution started, the TOP state of the base will be executed again with all connected extensions likewise executed again.

Figure 12:
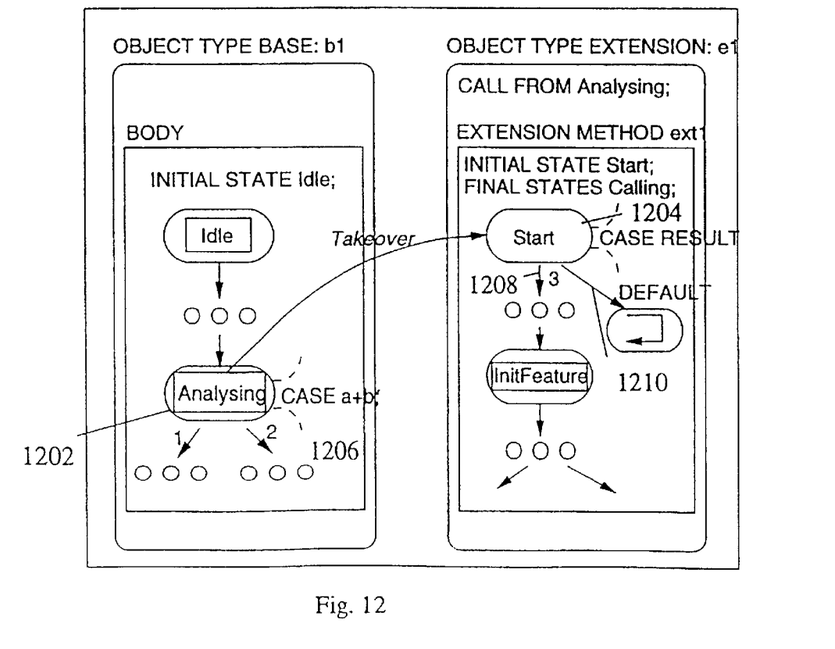
FIG. 12 shows a conditioned extension case.

In FIG. 12 an example of a conditioned extension is shown. Conditioned extensions are those executed only if certain conditions are fulfilled. This case is specified by means of a CASE expression which is associated with the original state of the extension method. The example starts from the presumption that the specifications of a base object and an extension object, respectively, are indicated as shown in the Figure. In an extension view not shown a state analyzing is furthermore stated as TOP. a and b are attributes in the base object.

When the base object reaches the state analyzing, at 1202, it turns out that there is an extension starting from this TOP point. The extension method will then start its execution by a CASE expression associated with the initial state of the extension method, indicated at 1204. The value of this expression is used to branch the flow.

In this case it is the question of a simple RESULT reference to the value of the CASE expression in the base, indicated at 1206. The expression (a+b) is calculated. If its value is 3 the branch indicated by the value 3 is selected, indicated at 1208, and execution is continued in the extension. Otherwise the DEFAULT branch is selected, indicated at 1210, and the execution control is returned to the base. The base must then reevaluate the CASE expression and can thereupon continue with the appropriate branch.

In the example given above the CASE expression associated with the original state of the extension method was very simple. But it could be an arbitrary expression of a scalar type.

RESULT is a keyword used to allow an extension to refer to the result of a CASE expression in a non-wait state in the base. RESULT can be used in each expression but its value cannot be changed during execution of the whole extension method. If there is no suiting branch or a DEFAULT branch, there is an error. If the extension method has a branch with the same value as the base the extension method overrides the base.

If the extension starts from a wait state in the base, the original state of the extension method must likewise be a wait state that specifies further events waited for. In a wait state all expected states for all extension methods are collected at this point in a simple WAIT-FOR-EVENT.

Figure 13:
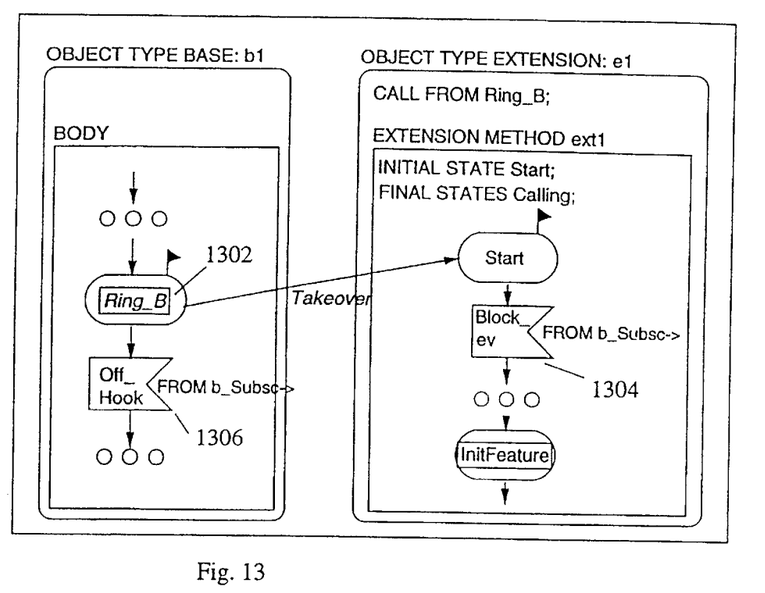
FIG. 13 shows a case implying an event extension.

FIG. 13 provides an example of an event extension and starts from the presumption that specifications of a base object and an extension object are as in the Figure. Furthermore a state Ring_B is specified as TOP in an extension view not shown.

When the base object reaches the state Ring_B, indicated at 1302, it is found that there is an extension starting from this TOP point. The runtime system must then collect information from the extension object with respect to which events that shall be monitored, and put together this information with the wait state information in the base object. In that way a composite wait state is created and introduced. Depending upon the events appearing then, either the extension or the base will be executed. If Block_Ev, indicated at 1304, is specified in the extension, the extension method is executed. The base is executed if Off_hook, specified in the base and indicated at 1306, is received.

Two extensions can await the same event, also the same events as the base. The extension with the highest priority will then be executed.

Extensions and wait states cannot execute BACK (TO BASE), they must continue to a COP state in the base or EXIT. If the execution of an extension method leads back to the original state of the extension method (e.g. Start in the above example), the extension method is executed again, but this time only the events specified in the extension method are awaited. If "the whole" wait state shall be introduced again, the wait state has to be defined as a TOP COP point in the base and "continue to" the TOP COP state must be stated in the extension method.

It is also possible to have more extensions to one and the same TOP point in the base object. In this case all extension objects must be organized in a specific priority order and execution is performed according to this priority order, i.e. extension objects with the highest priority are executed first. If this extension returns its execution control to the base, the extension object with the next-highest priority is executed. If all extensions return the execution control, also the base will be executed.

If an extension method continues to a continuation point in the base no more extension methods will be managed. The execution continues quite simply in the base. The state "continued to" may of course have extensions. If this is the case everything starts anew.

Figure 14:
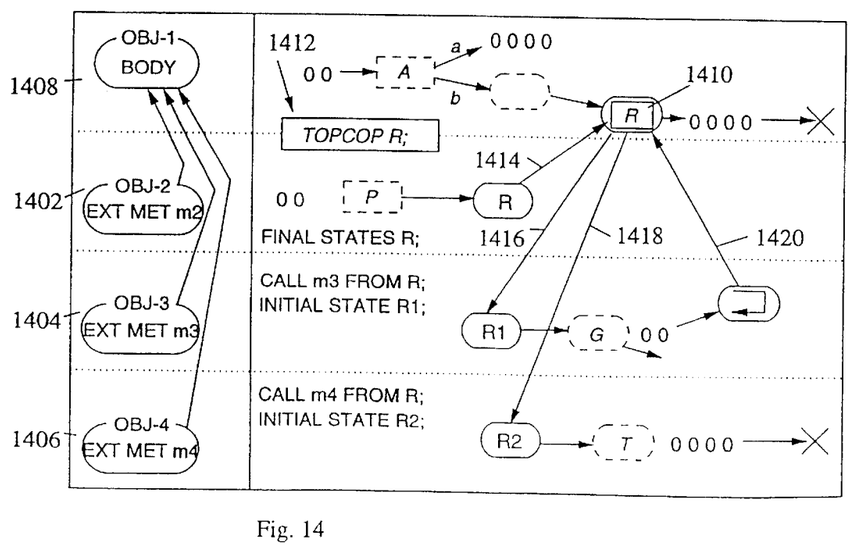
FIG. 14 shows a case with several extensions at the same extension point.

In FIG. 14 there is given an example with three extension methods m2, m3 and m4, indicated at 1402, 1404 and 1406, respectively, and a base, indicated at 1408, with an extension point R, indicated at 1410, which is declared as TOP COP, indicated at 1412.

The first extension performs "continue to" TOP COP in the base, indicated with arrow 1414. The two other extension flows take over from the TOP COP state 1410, indicated at 1416 and 1418, respectively. The extension method m3 returns the execution control to the base by using BACK. If m3 has a higher priority than m4, m3 is executed first, followed by m4, under the condition that m3 returns the execution control, indicated at 1420. If m4 has a higher priority than m3, only m4 is executed. In this case m3 has never any possibility to be executed due to the fact that m4 does never return to the base.

There may also be object types which implement interaction managing extension functions, which manage interaction between supplementary functions. The use of interaction supplementary functions is described e.g. in the earlier Swedish patent applications 93 02024-6 and 94 00209-4. The measures described in the later application with reference to the FIGS. 15*a*/15*b* included therein as performed by a base function, could thus be performed by means of an interaction managing extension object. In that connection, the concept described above with reference to FIG. 14 regarding connection of more extensions to one and the same TOP point in a base object can e.g. be used. An interaction managing extension object could thus be connected to the same TOP point in a base object, as two extension objects which represent each one of two interacting extension functions. For further information regarding the solution of the interaction problem reference is made to the mentioned Swedish patent applications.

What is claimed is:

1. In a telecommunication system providing subscriber services and having an object oriented system platform containing a number of function layers, one layer with operating system functions, an application platform located thereon and containing telecommunication abstractions in the form of resource objects, and thereupon an uppermost layer containing desired applications in the form of base and supplementary functions which provide base and supplementary services, a method for modifying and extending the subscriber services, comprising the steps of providing in the uppermost layer base objects being object types implementing base functions which may need to be extended in the future, and being designed for a specific task that can be performed with a minimum of coordination with other base objects, and extension objects being object types implementing extension functions providing extensions to the base functions and enabling addition of new services and modification and extension of existing services without changing the software of a system that has already been implemented and supplied, while designing the extension objects for enabling introduction of extensions into a system in operation which are dynamically bound to a base object to be modified, and addition and removal, in runtime, of modifications of the system in a generic way without programming a specific support for activating/deactivating each extension, defining the behavior of included base and extension object types by describing the behavior of each included method as a finite state machine consisting of a finite number of states and transitions between these states, executing in said transitions the code as transition actions and adding the extensions at said states for taking over the execution control in an extension point and return the control to another one, or the same extension point in the same method.

2. A method according to claim 1, comprising the step of also implementing extension objects being object types that implement extension functions, which form extensions to the extension functions.

3. A method according to claim 1, comprising the step of also implementing extension objects being object types implementing interaction managing extension functions, which manage interaction between supplementary services.

4. A method according to claim 1, comprising the step of loading only definitions of the extensions in the system, that indirectly modify the behavior of the system by taking over the execution control in specific predetermined extension points.

5. A method according to claim 1, comprising the steps of defining, in a specification for an extension object, at which extension points in the extension object the extension is assumed to take over the control and at which extension points it can return the control.

6. A method according to claim 5, comprising the steps of starting execution by a predefined extension method when an extension object takes over the control.

7. A method according to claim 5, comprising the step of handling by a runtime system creation of extension objects and invocation of their extension methods at the stated extension points.

8. A method according to claim 1, comprising the step of providing for an extension object access to attributes and methods of the base object or the extension object from which the extension takes over the control.

9. A method according to claim 8, comprising the step of having all said attributes and methods to be declared in an accessible object type specification.

10. A method according to claim 5, comprising the step of also defining in the object type specification access restrictions for each extension point by defining that only a specific subset of the attributes and methods in the specification are available for extensions taking over the control in a certain extension point.

11. A method according to claim 4, comprising the step of providing the object type specification for an extendable object as one working like an interface delimiting the amount of information visible and available to extensions of the extendable object.

12. A method according to claim 11, comprising the step of implementing an interface layer defined by extension views which each define a subset of information in the specification of an extendable object that shall be able to be accessed by extensions using the view.

13. A method according to claim 1, comprising the step of providing for a base object a specification working as an interface description showing states, attributes and methods available to the extensions and defining an interface towards a client object needing to create instances of the base object, said interface being defined by methods of the base object type deciding parameters to be used when creating the new instance.

14. A method according to claim 13, comprising the step of implementing the specification to provide a high level description of the behavior of the base object type while leaving out implementation details unnecessary for attaining an understanding of the functioning of the object type.

15. A method according to claim 14, comprising the step of creating an abstraction layer by an object logic used by the base object, and local methods in the base object comprising use of the object logic.

16. A method according to claim 15, comprising the steps of showing in a specification the wait state of the base object and selected non-wait states, if any, which are fundamental for understanding the functioning of the base object, and introducing code for execution between the states in local methods declared in the specification.

17. A method according to claim 16, comprising the step of deciding contents of the specification while considering object type parts apt to be exposed to extensions in a future.

18. A method according to claim 17, comprising the step of showing in the method specification all states, wait states as well as non-wait states, and all explicitly denominated extension points, and using action code at state transitions in local methods.

19. A method according to claim 18, comprising the steps of recognizing parts of the behavior not needing to be extendable and introducing these parts in their entirety in local methods defined in the specification or realization, or on an implementation level.

20. A method according to claim 19, comprising the step of using the object type realization for parts of base objects which do not need to, or cannot, be extendable, and which are not necessary to be shown in the specification to create a high level description, but where a definition is preferred instead of using implementation language directly.

21. A method according to claim 20, comprising the step of including in the realization definitions of local methods introducing action code.

22. A method according to claim 20, comprising the step of including in the realization, while overriding behavior definitions included in the specification, a detailed behavior definition implying a refining of the behavior specified in the specification.

* * * * *